(12) United States Patent
Wrobel et al.

(10) Patent No.: US 9,422,822 B2
(45) Date of Patent: Aug. 23, 2016

(54) TURBINE COMPRISING A SEALING DEVICE BETWEEN THE STATOR BLADE CARRIER AND THE HOUSING

(71) Applicant: ALSTOM Technology Ltd, Baden (CH)

(72) Inventors: Andras Wrobel, Nussbaumen (CH); Egon Geist, Dogern (DE)

(73) Assignee: ALSTOM Technology Ltd, Baden (CH)

( * ) Notice: Subject to any disclaimer, the term of this patent is extended or adjusted under 35 U.S.C. 154(b) by 391 days.

(21) Appl. No.: 14/011,179

(22) Filed: Aug. 27, 2013

(65) Prior Publication Data

US 2013/0343879 A1 Dec. 26, 2013

Related U.S. Application Data

(63) Continuation of application No. PCT/EP2012/053235, filed on Feb. 27, 2012.

(30) Foreign Application Priority Data

Feb. 28, 2011 (CH) .................................... 00342/11

(51) Int. Cl.
*F01D 11/00* (2006.01)
*F01D 25/24* (2006.01)
*F02C 7/28* (2006.01)

(52) U.S. Cl.
CPC ............ *F01D 11/001* (2013.01); *F01D 11/003* (2013.01); *F01D 11/005* (2013.01); *F01D 25/246* (2013.01); *F02C 7/28* (2013.01); *F05D 2240/55* (2013.01)

(58) Field of Classification Search
USPC .......... 415/174.2, 174.3, 174.4, 174.5, 173.5, 415/173.6, 173.7, 230; 277/303, 412, 418
See application file for complete search history.

(56) References Cited

U.S. PATENT DOCUMENTS

| 1,625,541 | A |   | 4/1927  | Hodgkinson |
|-----------|---|---|---------|------------|
| 5,676,521 | A |   | 10/1997 | Haynes     |
| 5,775,873 | A | * | 7/1998  | Dalton ................. F01D 11/001 415/121.2 |

(Continued)

FOREIGN PATENT DOCUMENTS

| CN | 1499046 A | 5/2004 |
|----|-----------|--------|
| CN | 1839274 A | 9/2006 |

(Continued)

OTHER PUBLICATIONS

Decision of Grant issued from Russian Patent Office dated Oct. 9, 2015 for RU Application No. 2013143622.

*Primary Examiner* — Binh Q Tran (57) ABSTRACT

The invention relates to a turbine of a power plant, having a stator, which has a housing and in the housing at least one stator blade carrier comprising stator blades. A rotor is provided which has a rotor shaft having rotor blades. At least one sealing device is provided which axially seals the respective stator blade carrier with respect to the housing and separates two regions having different pressures from one another. Improved sealing action is achieved in that the sealing device includes an axially acting primary sealing ring extending in the circumferential direction, and an axially acting additional sealing ring extending in the circumferential direction. The primary sealing ring facing the region has the lower pressure. The additional sealing ring facing the region has the higher pressure. The primary sealing ring is attached axially rigidly on the stator blade carrier. The additional sealing ring is attached axially movably, wherein the additional sealing ring is tensioned axially in the direction of the region having the higher pressure by means of at least one spring element.

19 Claims, 3 Drawing Sheets

(56) References Cited

U.S. PATENT DOCUMENTS

| | | | | |
|---|---|---|---|---|
| 6,318,728 B1 * | 11/2001 | Addis | ................... | F01D 11/001 277/355 |
| 6,761,530 B1 * | 7/2004 | Ginessin | ............... | F01D 11/025 415/173.7 |
| 6,786,488 B2 * | 9/2004 | Laurello | ................... | F02C 7/28 277/355 |
| 8,047,767 B2 * | 11/2011 | Montgomery | .......... | F01D 11/00 415/101 |
| 8,128,351 B2 * | 3/2012 | Narita | ................... | F01D 11/001 415/173.1 |
| 2004/0096312 A1 | 5/2004 | Tomko et al. | | |

FOREIGN PATENT DOCUMENTS

| | | |
|---|---|---|
| CN | 101035966 A | 9/2007 |
| CN | 101189411 A | 5/2008 |
| DE | 732 470 | 3/1943 |
| DE | 926 071 | 4/1955 |
| EP | 1 445 519 | 8/2004 |
| EP | 1 744 017 | 1/2007 |
| JP | 55 052501 | 4/1980 |
| JP | 58 185903 | 10/1983 |
| JP | 10 169408 | 6/1998 |
| RU | 2345233 C2 | 1/2009 |

* cited by examiner

TURBINE COMPRISING A SEALING DEVICE BETWEEN THE STATOR BLADE CARRIER AND THE HOUSING

CROSS-REFERENCE TO RELATED APPLICATIONS

This application claims priority to PCT/EP2012/053235 filed Feb. 27, 2012, which in turn claims priority to Swiss Application 00342/11 filed Feb. 28, 2011, the contents of which are both hereby incorporated in their entirety.

TECHNICAL FIELD

The present invention relates to a turbine of a power plant, preferably a steam turbine.

BACKGROUND

US 2004/0096312 A1 shows a turbine having the features of the preamble of claim 1. The stator blade carrier in this case possesses an annular web, in the end faces of which are arranged undercut ring ducts which in each case receive a seal cooperating sealingly with a confronting ring-shaped radial surface of the turbine housing. In this case, the seals, held immovably on the stator blade carrier in the axial direction of the rotor, also serve for fixing the stator blade carrier axially.

DE 732 470 shows a turbine in which the stator blade carrier is sealed off with respect to the housing by means of two seals, a seal arranged fixed on the housing cooperating with the stator blade carrier in the manner of an axial bearing, and a seal arranged in a circumferential groove on the stator blade carrier shutting off a ring-shaped radial gap between the stator blade carrier and housing.

U.S. Pat. No. 1,625,541 shows a turbine, in which the stator blade carrier engages positively by means of an outer-circumferential annular web into an inner-circumferential annular groove on the turbine housing, a gap which remains between one end face of the annular web and the confronting flank of the annular groove being closed off by means of a seal which is arranged in an annular groove on the abovementioned end face of the annular web.

JP 55-52501 illustrates a turbine housing and a stator blade carrier which has on its outer circumference a radially outwardly open annular groove, into which an annular web arranged on the housing engages with axial play. This play is eliminated by means of an annular spring which is tension-mounted axially between a flank of the annular groove of a stator blade carrier and the confronting end face of the housing-side annular web and moreover assumes the function of a seal.

According to DE 926 071, in a steam or gas turbine with a cylindrical stator blade carrier inserted into the turbine housing, there is provision whereby an annular part is arranged on the outer circumference of the stator blade carrier and has an outer circumferential groove, into which an inner-circumferential annular web of the housing engages positively, seals being arranged between the groove-side flanks and the confronting end faces of the annular web.

EP 1 744 017 A1 shows a combined steam turbine with a high-pressure module and with a medium-pressure module in a housing common to both modules, the housing having an inner housing with two expansion sections and an outer housing surrounding the inner housing. In this case, a seal arrangement is provided between the inner and outer housing at the interface between the two modules.

EP 1 445 519 A1 relates to a high-pressure sealing ring for steam turbines, there being provided for sealing off an interspace from an outside space between a first sealing partner and a second sealing partner a tube-like sealing ring which has two legs in cross section, one leg bearing against the first sealing partner and the other leg against the second sealing partner, and the sealing ring being firmly clamped to the second sealing partner via a holding device. One leg of the sealing ring lies sealingly on an end face extended in a radial plane, while the other leg of the sealing ring bears against an inner circumferential surface.

JP 10-169408 shows, on the one hand, sealing rings with a U-shaped cross section between radial surfaces confronting one another and, on the other hand, a sealing ring between an inner circumferential surface and an outer circumferential surface coaxial thereto.

JP 58185903 shows an annular web which is arranged on an inner circumferential surface and which engages into a circumferential groove on an outer circumferential surface, a seal being arranged between a flank of the circumferential groove and the confronting end face of an annular web.

U.S. Pat. No. 5,676,521 discloses a turbine for a power plant, having a stator which has a housing and in the housing two stator blade carriers with a plurality of rows of stator blades. Furthermore, the turbine comprises a rotor which has a rotor shaft with a plurality of rows of moving blades. Moreover, a sealing device is provided in each case for the respective stator blade carrier, said sealing device sealing the respective stator blade carrier axially with respect to the housing and at the same time separating two regions of different pressure from one another.

An effective axial seal inside the housing is especially important in order to avoid or reduce leakage flows. Such leakage flows may possess, particularly in steam turbines, comparatively pronounced abrasive effects which may lead in time to considerable damage to the respective sealing device or the respective stator blade carrier or housing. Such damage then has to be repaired at very high outlay. Moreover, leakage trails lead to significant losses of efficiency in the turbine.

SUMMARY

The present invention addresses this and is concerned with the problem of specifying for a turbine of the type already mentioned an improved embodiment which is distinguished particularly by improved sealing off or by reduced wear.

The invention is based on the general idea of equipping the sealing device with two sealing rings which extend in each case in the circumferential direction and which act in each case axially. Accordingly, the respective sealing device comprises a main sealing ring, which confronts the region having the lower pressure, and an additional sealing ring, which confronts the region having the higher pressure. Two-stage sealing off between the two regions is thereby implemented, with the result that the pressure difference at the respective sealing ring is reduced, thus improving the sealing action and reducing leakages.

According to the invention, the additional sealing ring is to be attached axially movably to the stator blade carrier. When the turbine is in operation, the respective stator blade carrier is driven axially in the direction of the region having the lower pressure on account of the pressure conditions prevailing inside the turbine. In this case, axial adjustment of the stator blade carrier in relation to the housing may occur. The axially movable additional sealing ring can then compensate said relative movements between the stator blade carrier and housing and thus maintain the sealing action of the respective sealing device.

The terms "lower pressure" and "higher pressure" are not to be understood absolutely, but relatively, and so in the region having the lower pressure the prevailing pressure is smaller, that is to say lower than in the region having the higher pressure. For example, the respective stator blade carrier may carry high-pressure blading, and so the sealing device, for example, seals a high pressure with respect to a high medium pressure or with respect to a low pressure. Insofar as the blade carrier possesses medium-pressure blading, the sealing device, for example, seals a high or relatively higher medium pressure with respect to a low or relatively lower medium pressure. Insofar as the stator blade carrier carries low-pressure blading, the sealing device, for example, seals a high pressure or low medium pressure with respect to a low pressure.

The terms "axially", "radially" and "circumferential direction" in each case refer in the present context to an axis of rotation of the rotor which defines the axial direction, that is to say runs axially.

According to an advantageous embodiment, the main sealing ring may be arranged on an annular shoulder projecting radially from the respective stator blade carrier and extending in a circumferential direction and may have an axial sealing contour which cooperates with an axial countersealing contour formed on the housing. An axial sealing contour of this kind, which cooperates with a complementarily axial countersealing contour, makes it possible in the region of the main sealing ring to have radial relative movements between the stator blade carrier and housing which may arise due to thermal expansion effects. Since the main sealing ring confronts the region having the lower pressure, the axial support of the stator blade carrier on the housing takes place via the main sealing ring, with the result that, within the sealing device, the main sealing ring brings about axial positioning or axial guidance of the respective stator blade carrier relative to the housing.

In particular, there may be provision whereby the countersealing contour is formed in a reception groove which extends in the circumferential direction and into which the annular shoulder penetrates radially. This gives rise in the axial direction to a two-sided positive connection between the respective stator blade carrier and the housing by means of the annular shoulder engaging into the reception groove.

According to an advantageous embodiment, the main sealing ring may be fastened axially to the respective stator blade carrier, with the result that an unequivocal relative position between the main sealing ring and stator blade carrier can be defined. For this purpose, in particular, there may be provision whereby fastening screws are used which run axially and engage into the main sealing ring on an axial side confronting the additional sealing ring. In other words, the main sealing ring is screwed on the rear side with respect to its front-side sealing contour.

In another embodiment, the main sealing ring may be inserted into a main annular groove which is open axially toward the region having the lower pressure and which extends in the circumferential direction. This main annular groove may be formed, in particular, in the abovementioned annular shoulder. A defined relative position is produced for the main sealing ring with the aid of the main annular groove. In this case, expediently, there may be provision whereby the main annular groove possesses a cross-sectional profile which is undercut-free in the axial direction. For example, the main annular groove may possess a U-shaped cross-sectional profile or be configured as a U-shaped groove. Insofar as the main annular groove possesses an undercut-free cross-sectional profile, the main sealing ring can be inserted axially into the main annular groove, thus making assembly simpler.

According to an advantageous embodiment, the additional sealing ring may be arranged on an annular shoulder projecting radially from the respective stator blade carrier and extending in the circumferential direction and may have an axial sealing contour which cooperates with an axial countersealing contour formed on the housing. An axial sealing contour of this kind, which cooperates with a complementarily axial countersealing contour, makes it possible in the region of the additional sealing ring to have radial relative movements between the stator blade carrier and housing which may arise due to thermal expansion effects.

Here, too, there may expediently be provision whereby the countersealing contour is formed in a reception groove which extends in the circumferential direction and into which the annular shoulder penetrates radially. Advantageously, the main sealing ring and additional sealing ring are arranged on the same annular shoulder on opposite axial sides. Said reception groove then contains both countersealing contours which confront one another.

An embodiment is in this case especially expedient in which the additional sealing ring is driven axially in the direction of the region having the higher pressure by means of at least one spring element. The additional sealing ring thus always remains in axial bearing contact with its sealing contour against the associated countersealing contour under axial prestress, even when the stator blade carrier moves axially in relation to the housing.

According to another advantageous embodiment, the additional sealing ring may be inserted into an additional annular groove which is open axially toward the region having the higher pressure and which extends in the circumferential direction. For the additional sealing ring, too, this gives rise to optimal positioning at least in the radial direction relative to the respective stator blade carrier. There may in this case expediently be provision whereby the additional annular groove possesses a cross-sectional profile with undercut in the axial direction. What can be achieved thereby is that the additional sealing ring, although being axially adjustable within the additional annular groove, cannot escape axially from the latter. The undercut ensures a positive connection between the additional sealing ring and stator blade carrier, insofar as the additional sealing ring is shaped complementarily to the cross-sectional profile of the additional annular groove. In particular, the additional sealing ring may possess in its cross-sectional profile at least one radially projecting web which positively cooperates axially with a respective undercut of the additional annular groove. For example, the additional annular groove may possess a T-shaped cross-sectional profile or may be configured as a T-shaped groove. Expediently, the additional annular groove and the abovementioned main annular groove are arranged axially in alignment on the same annular shoulder on axial sides facing away from one another.

According to another advantageous embodiment, the respective spring element may be arranged in the additional annular groove axially between the additional sealing ring and the stator blade carrier. By virtue of this form of construction, the respective spring element is protected optimally against impurities.

In another embodiment, the additional sealing ring may axially overlap the abovementioned fastening screws which are used for fixing the main sealing ring. Thus, these fastening screws, too, are protected against impurities, particularly within the additional annular groove. There may in this case expediently be provision whereby these fastening screws have been arranged so as to be countersunk axially in the additional annular groove.

In another advantageous embodiment, the housing, the respective stator blade carrier, the respective main sealing ring and the respective additional sealing ring may be divided in a parting plane into two housing parts, two stator blade carrier parts, two main sealing ring parts and two additional sealing ring parts. Said parting plane is in this case positioned such that the axis of rotation of the rotor also lies in this parting plane. By said main components of the turbine being divided, simplified assembly is obtained. Moreover, disassembly for maintenance purposes is simplified.

An embodiment is in this case especially expedient in which the additional sealing ring part inserted into the half additional annular groove is secured in the region of the parting plane, at the respective circumferential end, to the respective stator blade carrier part in the circumferential direction by means of a securing element, preferably by means of a securing screw. This prevents the situation where the additional sealing ring part, axially movable per se, changes its relative position with respect to the stator blade carrier part in the circumferential direction.

The sealing contours of the main sealing ring and/or of the additional sealing ring expediently extend radially and in the circumferential direction. They may, in particular, have a plurality of annular webs which extend in each case in the circumferential direction, are arranged radially next to one another and project axially. A labyrinth effect, which considerably improves the sealing action of the respective axial seal, can thereby be implemented in the radial direction. In contrast to the sealing contours, the countersealing contours of the housing expediently have a planar configuration, at the same time likewise extending radially and in the circumferential direction.

The present invention is preferably implementable in steam turbines. In principle, however, the turbine may also be a gas turbine. Insofar as the turbine is designed as a steam turbine, it is preferably configured as a reaction type. An embodiment of an action type or impulse type is likewise conceivable.

Further important features and advantages of the invention will be gathered from the subclaims, from the drawings and from the accompanying description of the figures with reference to the drawings.

It will be appreciated that the features mentioned above and those yet to be explained below can be used not only in the combinations specified in each case, but also in other combinations or alone, without departing from the scope of the present invention.

Preferred exemplary embodiments of the invention are illustrated in the drawings and are explained in more detail in the following description, the same reference symbols referring to identical or similar or functionally identical components.

BRIEF DESCRIPTION OF THE DRAWINGS

In the drawings, in each case diagrammatically.

DETAILED DESCRIPTION

The invention is explained in more detail below by means of exemplary embodiments and the drawings.

Figure 1:
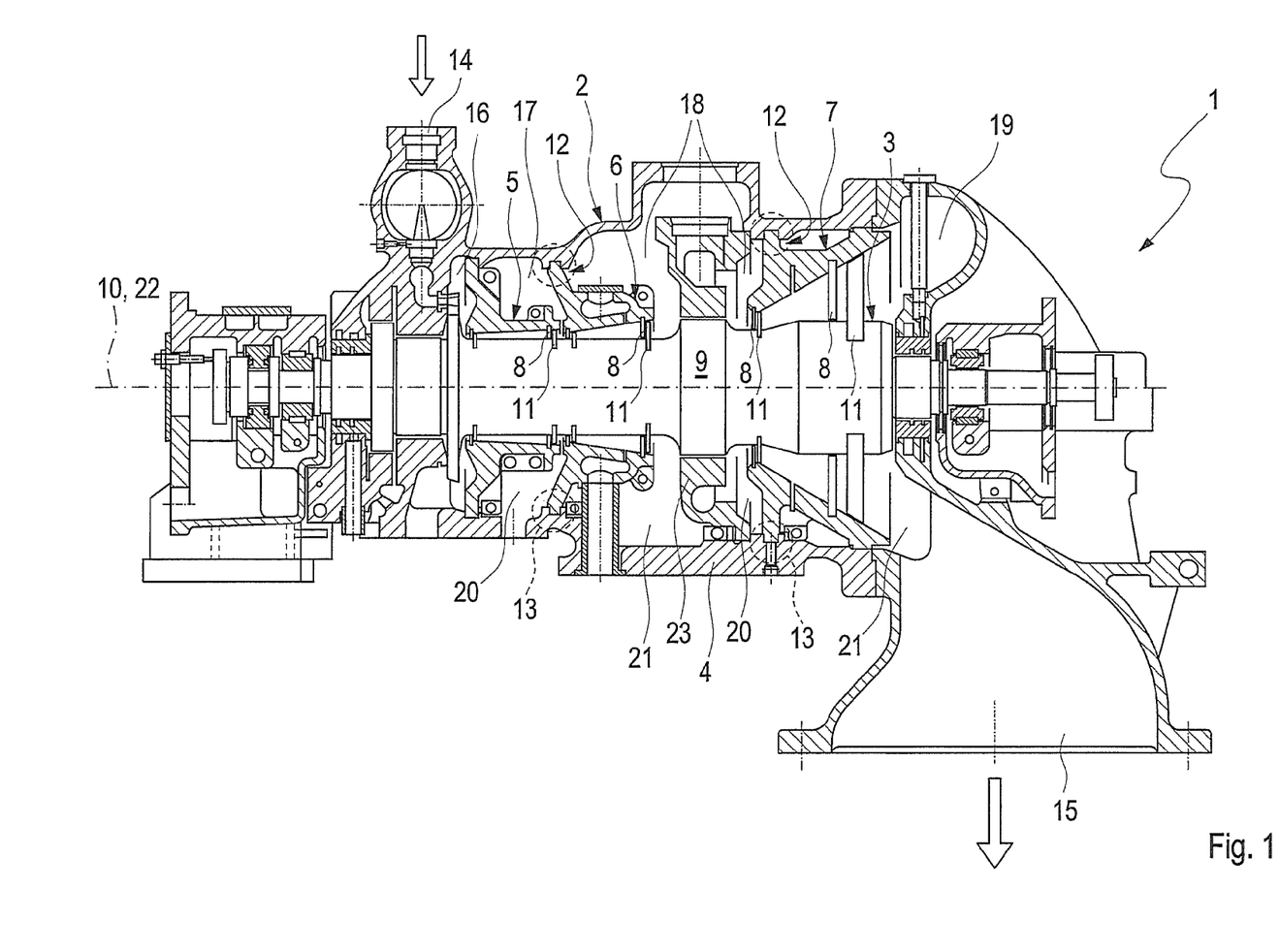
FIG. 1 shows a highly simplified longitudinal section through a turbine.

According to FIG. 1, a turbine 1 of a power plant, not otherwise shown, comprises a stator 2 and a rotor 3. The turbine 1 is preferably configured as a steam turbine. The steam turbine is in this case preferably of the reaction type.

The stator 2 has a housing 4 and at least one stator blade carrier 5, 6, 7. In the example shown, three stator blade carriers 5, 6, 7 are provided, to be precise one each for high pressure, medium pressure and low pressure. In the illustration of FIG. 1, the high-pressure stator blade carrier 5 is located on the left. This is followed by the medium-pressure stator blade carrier 6. The low-pressure stator blade carrier 7 is then positioned on the right. Each stator blade carrier 5, 6, 7 carries a plurality of stator blades 8, of which only a few are illustrated by way of example in FIG. 1.

The rotor 3 possesses a rotor shaft 9, which is mounted rotatably about an axis of rotation 10 in the stator 2 or on the housing 4. The rotor 9 carries a plurality of moving blades 11, some of which are indicated by way of example in FIG. 1.

For at least one of the stator blade carriers 5, 6, 7, the turbine 1 has a sealing device 12 which is provided in each case in a sealing region 13, indicated by a broken line, between the respective stator blade carrier 5, 6, 7 and the housing 4. In the embodiment presented here, only two of the three stator blade carriers 5, 6, 7 are equipped in each case with a sealing device 12 of this type. In particular, only the stator blade carrier 6 illustrated in the middle, that is to say the medium-pressure stator blade carrier 6, and the stator blade carrier 7 illustrated on the right, that is to say the low-pressure stator blade carrier 7, are equipped in each case with such a sealing device 12. It is clear that, in principle, the stator blade carrier 5 illustrated on the left, that is to say the high-pressure stator blade carrier 5, may also be equipped with a sealing device 12 of this type. It is likewise possible that only one of the stator blade carriers 5, 6, 7 is provided with a sealing device 12 of this type.

A stepwise reduction in pressure occurs from a steam inlet 14 of the steam turbine 1 as far as the steam outlet 15 of the steam turbine 1 via the individual stator blade carriers 5, 6, 7. In this case, a region 16 in which high pressure prevails exists on the leading side of the high-pressure stator blade carrier 5. A region 17 in which a high medium pressure prevails is located on the trailing side of the high-pressure stator blade carrier 5 and on the leading side of the medium-pressure stator blade carrier 6. On the trailing side of the medium-pressure stator blade carrier 6 there is a region 18 which extends as far as the inlet side of the low-pressure stator blade carrier 7 and in which a low medium pressure prevails. A region 19 in which low pressure prevails is then located on the outlet side of the low-pressure stator blade carrier 7.

The respective sealing device 12, then, is designed such that it seals the respective stator blade carrier 5, 6, 7 axially with respect to the housing 4, specifically such that the sealing device 12 at the same time in each case separates two regions 20 and 21 of different pressure from one another. In the case of the medium-pressure stator blade carrier 6, the associated sealing device 12 separates the region 17 having the high medium pressure from the region 18 having the low medium pressure. The region 20 having the relatively higher pressure is in this case formed by the region 17 having the high medium pressure, while the region 21 having the relatively lower pressure is formed by the region 18 having the low medium pressure. In the case of the low-pressure stator blade carrier 7, the associated sealing device 12 separates the region 18 having the low medium pressure from the region 19 having the low pressure. In this case, the region 20 having the relatively higher pressure is formed by the region 18 having the low medium pressure, while the region 21 having the relatively lower pressure is formed by the region 19 having the low pressure.

The housing 4 and the stator blade carriers 5, 6, 7 may be divided in a parting plane 22, the axis of rotation 10 lying in this parting plane 22. Purely by way of example, the parting plane 22 extends horizontally, with the result that the housing 4 and the stator blade carriers 5, 6, 7 are in each case divided into a lower part and an upper part.

Figure 2:
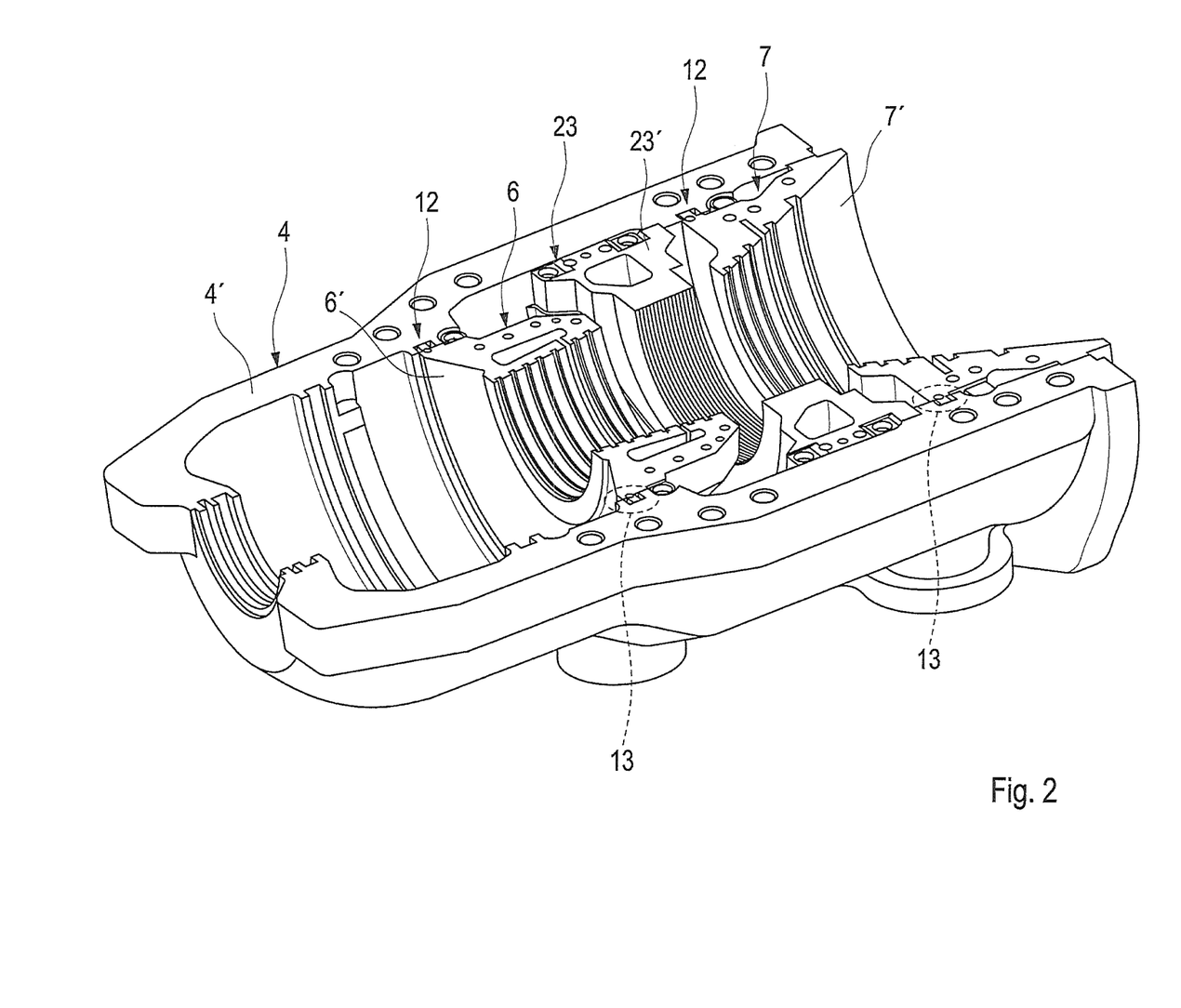
FIG. 2 shows a highly simplified isometric view of the turbine, with the housing open.

FIG. 2, then, shows an isometric view of the lower housing part 4' of the housing 4, the lower stator blade carrier part 6' of the medium-pressure stator blade carrier part 6, the lower stator blade carrier part 7' of the low-pressure stator blade carrier 7 and a lower intermediate piston housing part 23' of an intermediate piston housing 23, on which the rotor 3 is mounted axially between the medium-pressure stator blade carrier 6 and the low-pressure stator blade carrier 7. The two sealing devices 12 can be seen. The sealing region 13 of the medium-pressure stator blade carrier 6 is marked again by a broken line. This sealing region 13 of the medium-pressure stator blade carrier 6, then, is illustrated partially in section in FIG. 3. It is clear that the sealing region 13 of the low-pressure stator blade carrier 7 and/or of the high-pressure stator blade carrier 5, if present, may, in principle, be constructed correspondingly.

Figure 3:
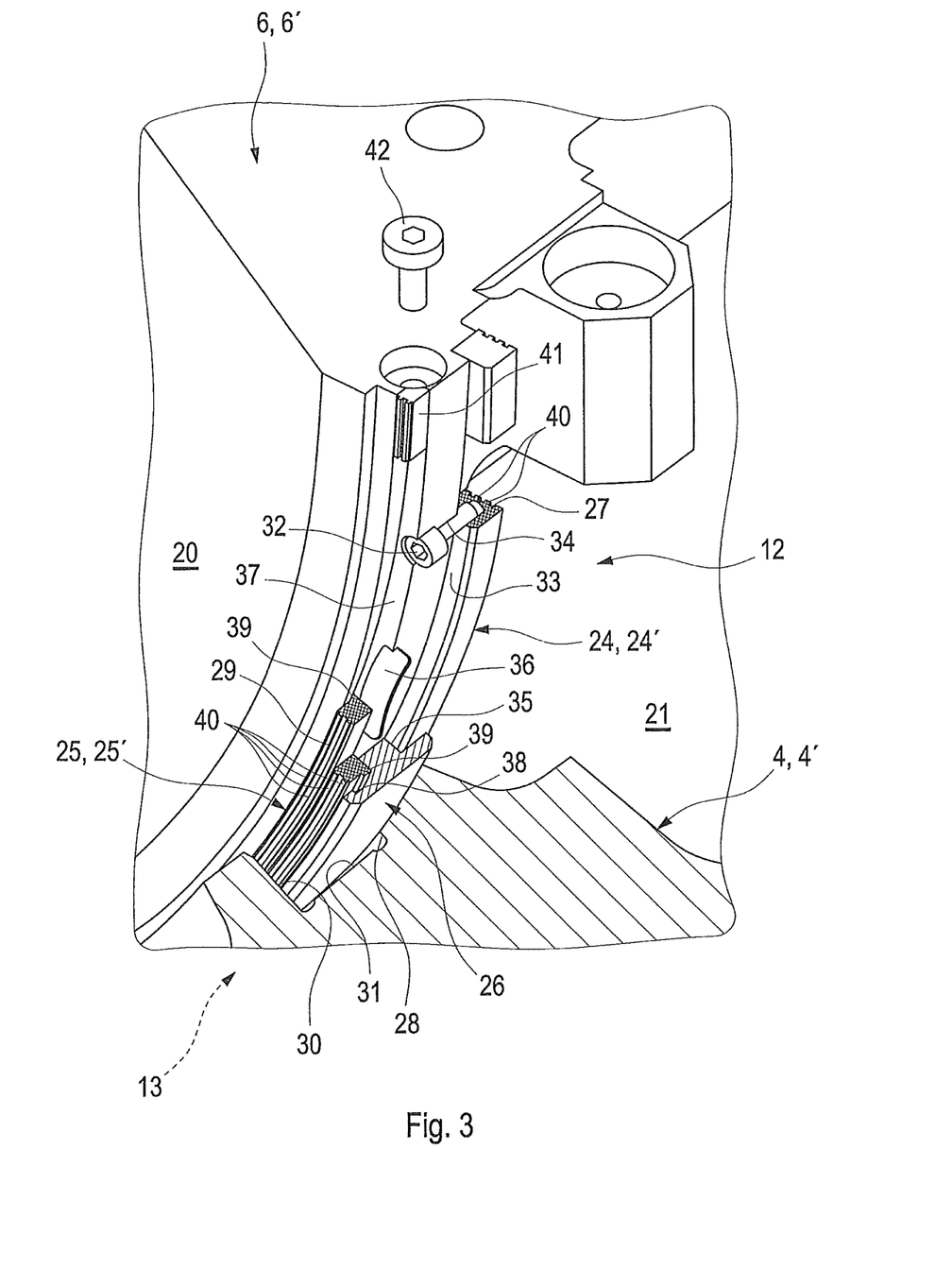
FIG. 3 shows a partial sectional isometric view of a detail of the turbine in the region of a sealing device.

According to FIG. 3, the respective sealing device 12 comprises a main sealing ring 24 and an additional sealing ring 25. The two sealing rings 24, 25 extend in the circumferential direction and act axially. The main sealing ring 24 confronts the region 21 having the lower pressure. In contrast to this, the additional sealing ring 25 confronts the region 20 having the higher pressure. The two sealing rings 24, 25 are thus arranged on sides facing away from one another.

To implement the sealing device 12, in the example shown the respective stator blade carrier 6 is equipped with an annular shoulder 26 which projects radially from the respective stator blade carrier 6 and which extends in the circumferential direction. In particular, both the main sealing ring 24 and the additional sealing ring 25 are arranged on this annular shoulder 26. The main sealing ring 24 possesses an axial sealing contour 27 which cooperates with an axial countersealing contour 28 formed on the housing 4. The additional sealing ring 25 possesses an axial sealing contour 29 which cooperates with a countersealing contour 30 formed on the housing 4.

For the sealing device 12, the housing 4 has formed on it a reception groove 31 which extends in the circumferential direction and which is dimensioned and positioned such that the respective annular shoulder 26 penetrates radially into this reception groove 31.

In this case, the annular shoulder 26 penetrates radially into the reception groove 31 to an extent such that the two sealing rings 24, 25 are located inside the reception groove 31. Correspondingly, the two countersealing contours 28, 30 are formed on the side walls of the reception groove 31 which lie axially opposite one another.

The main sealing ring 24 is fastened axially to the stator blade carrier 6, expediently to the annular shoulder 26. This axial fastening is expediently implemented with the aid of fastening screws 32, one of which is indicated by way of example in FIG. 3. The fastening screws 32 are expediently arranged such that they run axially, that is to say an axis of rotation of the respective fastening screw 32 is oriented axially. Furthermore, the fastening screws 32 engage into the main sealing ring 24 on an axial side 33 confronting the additional sealing ring 25, that is to say on a rear side 33 facing away from the sealing contour 27 of the main sealing ring 24. In the example, the fastening screws 32 pass in each case through a passage orifice 34 which is provided in the annular shoulder 26 axially between the two sealing rings 24, 25. Furthermore, these passage orifices 34 are expediently dimensioned such that the respective fastening screw 32 is arranged so as to be countersunk axially therein.

For the reception of the main sealing ring 24, the stator blade carrier 6 or its annular shoulder 26 has a main annular groove 35 which extends in the circumferential direction and which is open axially toward the region 21 having the lower pressure. This main annular groove 35 in this case possesses a cross-sectional profile which is undercut-free in the axial direction and which, in particular, may be of U-shaped design, so that the main annular groove 35 is configured in the example as a U-shaped groove. It is thereby possible, with the stator blade carrier 6 removed from the housing 4, to insert the main sealing ring 24 axially into the main annular groove 35.

It is noteworthy that the main sealing ring 24 projects axially out of the main annular groove 35, in particular with its sealing contour 27. This ensures that the stator blade carrier 6 is positioned axially with respect to the housing 4 in the region of the annular shoulder 26 or in the sealing region 13, to be precise as a result of the main sealing ring 24 or sealing contour 27 making contact axially on the housing 4 or on the countersealing contour 28.

While the main sealing ring 24 is firmly attached axially to the stator blade carrier 6, the additional sealing ring 25 is attached axially movably to the stator blade carrier 6. Moreover, the additional sealing ring 25 is driven axially with the aid of at least one spring element 36, specifically in the direction of the region 20 having the higher pressure. FIG. 3 indicates a single spring element 36 which may be configured as a leaf spring. The spring element 36 is in this case supported on a side, confronting the main sealing ring 24, of the additional sealing ring 25 and therefore drives the additional sealing ring 25 away from the main sealing ring 24.

To accommodate the additional sealing ring 25, the stator blade carrier 6 or its annular shoulder 26 is equipped with an additional annular groove 37 which extends in the circumferential direction and which is open axially toward the region 20 having the higher pressure. Expediently, then, this additional annular groove 37 possesses a cross-sectional profile with at least one undercut 38 which acts in the axial direction. For this purpose, for example, the additional annular groove 37 may be designed as a T-shaped groove. The additional sealing ring 25, then, is shaped complementarily to the additional annular groove 37 and correspondingly may possess, for example, a T-shaped profile. Accordingly, the additional sealing ring 25 possesses at least one radially projecting web 39 which inside the additional annular groove 37 overlaps the respective undercut 38 in the radial direction and cooperates positively therewith in the axial direction. To insert the additional sealing ring 25 into the additional annular groove 37, the additional sealing ring 25 must accordingly be introduced into the additional annular groove 37 in the circumferential direction. This can be implemented even when the stator blade carrier 6 or the respective stator blade carrier part 6' is already inserted into the housing 4 or in the respective housing part 4'.

Expediently, then, the respective spring element 36 is accommodated in the additional annular groove 37 and is in this case arranged axially between the additional sealing ring 25 and the stator blade carrier 6 or the annular shoulder 26. The fastening screws 32 and therefore also the passage orifices 34 are also located in the region of the additional annular groove 37, and so they are overlapped axially by the additional sealing ring 25. In this case, the abovementioned axially countersunk arrangement of the fastening screws 32 in the annular shoulder 26 or within the additional annular groove 37 is then important.

For the assembly of the turbine 1, it is expedient that the main sealing ring 24 and also the additional sealing ring 25 are also divided in the parting plane 22, with the result that at least two main sealing ring parts 24' or at least two additional sealing ring parts 25' are likewise present. In each case the lower sealing ring parts 24' and 25' can be seen in FIG. 3.

For the axial movability of the additional sealing ring 25 relative to the stator blade carrier 6, the radially projecting webs 39 are defined smaller in the axial direction than an axial clearance between the respective undercut 38 and a groove bottom, not designated in any more detail. Axial play between the additional sealing ring 25 and the associated additional annular groove 37 is accordingly formed. Moreover, the axial dimension of the annular shoulder 26 is smaller than the axial opening width of the reception groove 31. Thus, the annular shoulder 26 and therefore also the stator blade carrier 6 can move in the reception groove 31 axially relative to the housing 4. Such axial movement may occur due to the pressures arising during operation and due to thermal expansion effects.

Furthermore, radial play is provided radially between the annular shoulder 26 and the reception groove 31, thus making it possible, here too, to have between the stator blade carrier 6 and housing 4 radial relative movements which may likewise be caused thermally. The sealing device 12 can compensate these thermally induced relative movements. On the one hand, the sealing device 12 can compensate relative movements between the stator blade carrier 6 and housing 4 in the axial direction in that the additional sealing ring 25 is received axially movably and, in particular, is prestressed axially away from the main sealing ring 24. So that the required sealing action can be implemented even in the event of radial expansion or movement between the stator blade carrier 6 and housing 4, on the other hand, the two sealing rings 24, 25 act axially. For this purpose, in particular, the two sealing contours 27, 29 are oriented radially and in the circumferential direction, the associated countersealing contours 28, likewise being oriented radially and in the circumferential direction. While the countersealing contours 28, 30 expediently have a planar configuration and in each case lie in a plane which runs perpendicularly to the axis of rotation 10, the sealing contours 27, 29 may in each case having a plurality of annular webs 40 which in each case extend in the circumferential direction, are arranged concentrically with respect to one another, are arranged radially adjacently to one another and at the same time in each case project axially. By means of the annular webs 40, a labyrinth effect can be implemented in the radial direction within the respective axial seal.

To fix the additional sealing ring 25 or the respective additional sealing ring part 25' in the circumferential direction, a securing element 42, which is designed in the example shown in FIG. 3 as a securing screw 42, may be provided in the region of the parting plane 22 at each circumferential end 41 of the respective additional sealing ring part 25'. The securing screw 42 engages with its head radially and/or axially over a step, not visible here, formed on the rear side confronting the main sealing ring 24 and thus, by positive connection, prevents movement of the additional sealing ring 25 in the circumferential direction relative to the stator blade carrier 6.

What is claimed is:

1. A turbine of a power plant, preferably a steam turbine, the turbine comprising:
   a stator which has a housing and in the housing at least one stator blade carrier with stator blades,
   a rotor which has a rotor shaft with moving blades,
   at least one sealing device which seals the respective stator blade carrier axially with respect to the housing and separates two regions of different pressure from one another, the sealing device having a main sealing ring, which extends in the circumferential direction and acts axially and which confronts the region having the lower pressure, and an additional sealing ring, which extends in the circumferential direction and acts axially and which confronts the region having the higher pressure,
   wherein the main sealing ring is fixingly attached axially to the stator blade carrier and the additional sealing ring is attached axially movably to the stator blade carrier, the additional sealing ring being tensioned axially in the direction of the region having the higher pressure by at least one spring element wherein
   the main sealing ring is arranged on an annular shoulder projecting radially from the respective stator blade carrier and extending in the circumferential direction and has an axial sealing contour which cooperates with an axial countersealing contour formed on the housing wherein, the countersealing contour is formed in a reception groove which extends in the circumferential direction and into which the annular shoulder penetrates radially.

2. The turbine as claimed in claim 1, wherein
   for the main sealing ring, the stator blade carrier has provided on it fastening screws which run axially and which engage into the main sealing ring on an axial side confronting the additional sealing ring.

3. The turbine as claimed in claim 1 wherein
   the main sealing ring is inserted into a main annular groove which is open axially toward the region having the lower pressure and which extends in the circumferential direction, wherein, the main annular groove has a cross-sectional profile which is undercut-free in the axial direction.

4. A turbine of a power plant, preferably a steam turbine, the turbine comprising:
   a stator which has a housing and in the housing at least one stator blade carrier with stator blades,
   a rotor which has a rotor shaft with moving blades,
   at least one sealing device which seals the respective stator blade carrier axially with respect to the housing and separates two regions of different pressure from one another, the sealing device having a main sealing ring, which extends in the circumferential direction and acts axially and which confronts the region having the lower pressure, and an additional sealing ring, which extends in the circumferential direction and acts axially and which confronts the region having the higher pressure,
   wherein the main sealing ring is fixingly attached axially to the stator blade carrier and the additional sealing ring is attached axially movably to the stator blade carrier, the additional sealing ring being tensioned axially in the direction of the region having the higher pressure by at least one spring element, and
   the additional sealing ring is arranged on an annular shoulder projecting radially from the respective stator blade carrier and extending in the circumferential direction and has an axial sealing contour which cooperates with an axial countersealing contour formed on the housing, wherein, the countersealing contour is formed in a reception groove which extends in the circumferential direction and into which the annular shoulder penetrates radially.

5. The turbine as claimed in claim 1 wherein the additional sealing ring is inserted into an additional annular groove which is open axially toward the region having the higher pressure and which extends in the circumferential direction, wherein, the additional annular groove has a cross-sectional profile with an undercut in the axial direction.

6. The turbine as claimed in claim 5, wherein the respective spring element is arranged in the additional annular groove axially between the additional sealing ring and the stator blade carrier.

7. The turbine at least as claimed in claim 2, wherein the additional sealing ring overlaps the fastening screws axially, wherein, the fastening screws are arranged so as to be countersunk axially in the additional annular groove.

8. The turbine as claimed in claim 1, wherein the housing, the respective stator blade carrier, the respective main sealing ring and the respective additional sealing ring are divided in a parting plane, which contains an axis of rotation of the rotor, into two housing parts, two stator blade carrier parts, two main sealing ring parts and two additional sealing ring parts, wherein the additional sealing ring part inserted into the half additional annular groove is secured to the stator blade carrier in the circumferential direction in the region of the parting plane, at least one circumferential end, by a securing element, in particular a securing screw.

9. The turbine as claimed in claim 1, wherein for the main sealing ring, the stator blade carrier has provided on it fastening screws which run axially and which engage into the main sealing ring on an axial side confronting the additional sealing ring.

10. The turbine as claimed in claim 1, wherein the main sealing ring is inserted into a main annular groove which is open axially toward the region having the lower pressure and which extends in the circumferential direction, wherein the main annular groove has a cross-sectional profile which is undercut-free in the axial direction.

11. The turbine as claimed in claim 2 wherein the main sealing ring is inserted into a main annular groove which is open axially toward the region having the lower pressure and which extends in the circumferential direction, wherein the main annular groove has a cross-sectional profile which is undercut-free in the axial direction.

12. The turbine as claimed in claim 1, wherein the additional sealing ring is arranged on an annular shoulder projecting radially from the respective stator blade carrier and extending in the circumferential direction and has an axial sealing contour which cooperates with an axial countersealing contour formed on the housing, wherein the countersealing contour is formed in a reception groove which extends in the circumferential direction and into which the annular shoulder penetrates radially.

13. The turbine as claimed in claim 2 wherein the additional sealing ring is arranged on an annular shoulder projecting radially from the respective stator blade carrier and extending in the circumferential direction and has an axial sealing contour which cooperates with an axial countersealing contour formed on the housing, wherein the countersealing contour is formed in a reception groove which extends in the circumferential direction and into which the annular shoulder penetrates radially.

14. The turbine as claimed in claim 3 wherein the additional sealing ring is arranged on an annular shoulder projecting radially from the respective stator blade carrier and extending in the circumferential direction and has an axial sealing contour which cooperates with an axial countersealing contour formed on the housing, wherein the countersealing contour is formed in a reception groove which extends in the circumferential direction and into which the annular shoulder penetrates radially.

15. The turbine as claimed in claim 1 wherein the additional sealing ring is inserted into an additional annular groove which is open axially toward the region having the higher pressure and which extends in the circumferential direction, wherein the additional annular groove has a cross-sectional profile with an undercut in the axial direction.

16. The turbine as claimed in claim 2 wherein the additional sealing ring is inserted into an additional annular groove which is open axially toward the region having the higher pressure and which extends in the circumferential direction, wherein the additional annular groove has a cross-sectional profile with an undercut in the axial direction.

17. The turbine as claimed in claim 1, wherein the housing, the respective stator blade carrier, the respective main sealing ring and the respective additional sealing ring are divided in a parting plane, which contains an axis of rotation of the rotor, into two housing parts, two stator blade carrier parts, two main sealing ring parts and two additional sealing ring parts, wherein the additional sealing ring part inserted into the half additional annular groove is secured to the stator blade carrier in the circumferential direction in the region of the parting plane, at least one circumferential end, by a securing element, in particular a securing screw.

18. The turbine as claimed in claim 2, wherein the housing, the respective stator blade carrier, the respective main sealing ring and the respective additional sealing ring are divided in a parting plane, which contains an axis of rotation of the rotor, into two housing parts, two stator blade carrier parts, two main sealing ring parts and two additional sealing ring parts, wherein the additional sealing ring part inserted into the half additional annular groove is secured to the stator blade carrier in the circumferential direction in the region of the parting plane, at least one circumferential end, by a securing element, in particular a securing screw.

19. The turbine as claimed in claim 3, wherein the housing, the respective stator blade carrier, the respective main sealing ring and the respective additional sealing ring are divided in a parting plane, which contains an axis of rotation of the rotor, into two housing parts, two stator blade carrier parts, two main sealing ring parts and two additional sealing ring parts, wherein the additional sealing ring part inserted into the half additional annular groove is secured to the stator blade carrier in the circumferential direction in the region of the parting plane, at least one circumferential end, by a securing element, in particular a securing screw.

* * * * *